Feb. 7, 1939.  E. R. KEHRER  2,145,933
CONTINUOUS FILTER
Filed Aug. 14, 1937  2 Sheets-Sheet 1
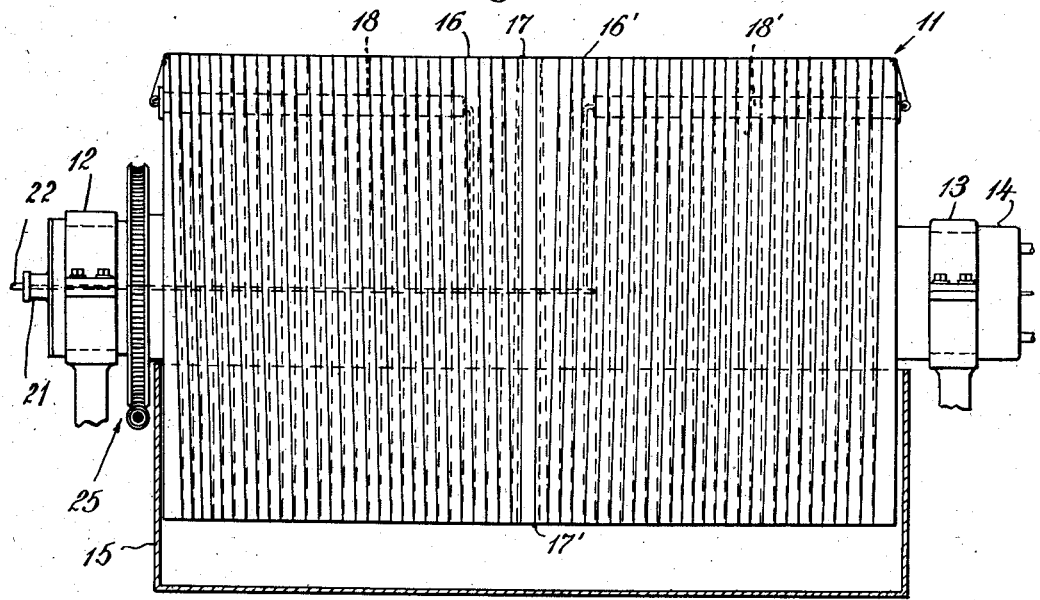
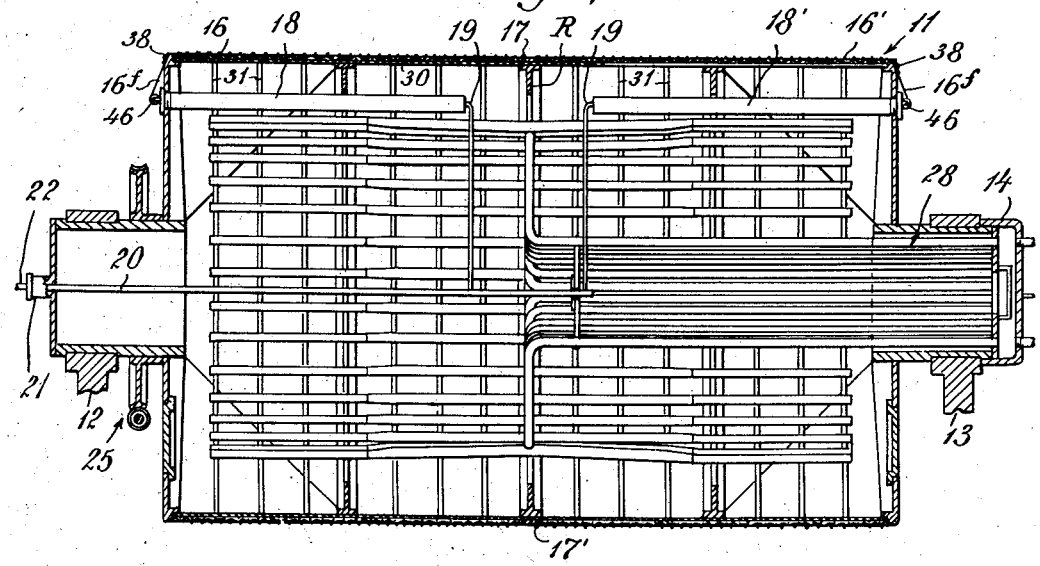
INVENTOR
Eddie R. Kehrer
BY
ATTORNEY

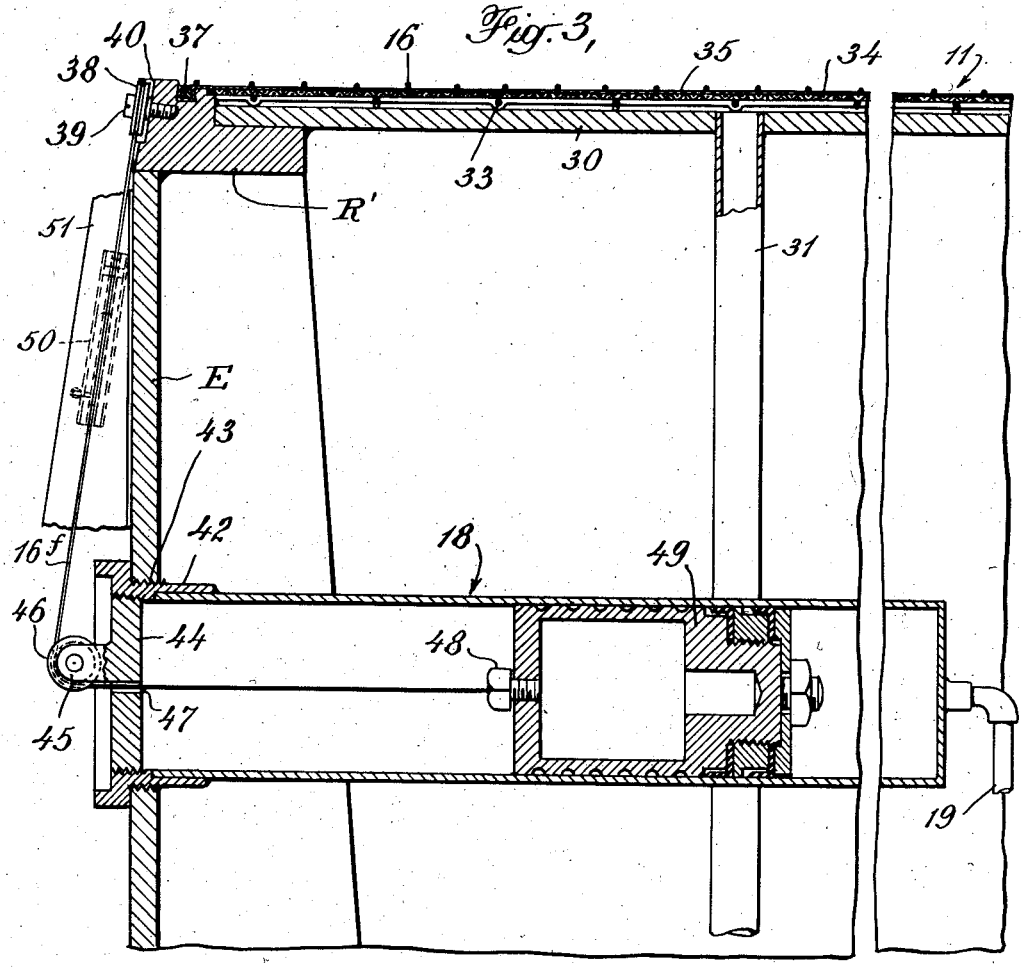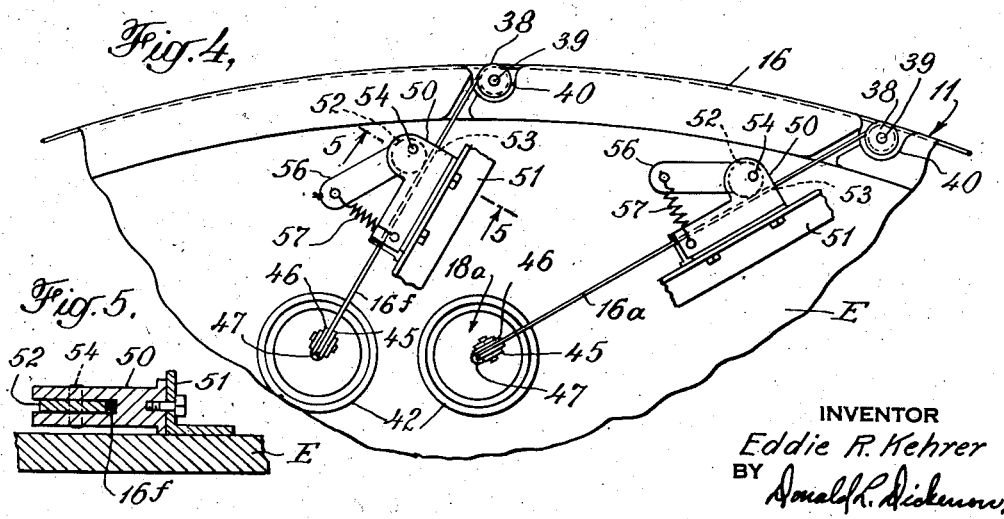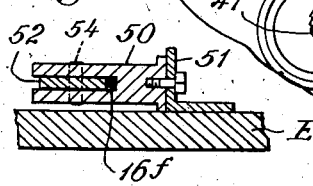

Patented Feb. 7, 1939

2,145,933

UNITED STATES PATENT OFFICE 2,145,933

CONTINUOUS FILTER

Eddie R. Kehrer, Beaumont, Tex., assignor to Socony-Vacuum Oil Company, Incorporated, New York, N. Y., a corporation of New York Application August 14, 1937, Serial No. 159,056

8 Claims. (Cl. 210—199)

This invention is directed in a general way to continuous filters of the rotary drum type and is more particularly related to improved means for holding the filter cloth in place on such a filter.

As is well known to those familiar with the art, a continuous drum type filter embodies a large drum mounted for rotation in suitable end bearings, the cylindrical periphery of such drum being provided with chambers about which the filter cloth is supported on a suitable mesh-work. These chambers are connected through a system of pipes to a valve manifold situated in one of the bearing structures whereby suction and pressure can be alternately applied to the different filter chambers as the drum revolves. The lower portion of the drum is emersed in a tank containing the liquid mixture to be filtered, and as that portion of the drum passes through the liquid, suction is applied to the submerged filter chambers, bringing into deposition on the filter cloth a filter cake of the solid material. As the drum continues its rotation, the filter cake is subjected to washing sprays, is dried by suction, and is then blown to loosen the cake. The cake is then removed from the drum by what is known as a doctor blade, which has a scraping action on the drum, lifting the cake off the drum and delivering into a suitable receptacle, from which it is carried away in any suitable manner.

For the purpose of holding the filter cloth in place upon the drum and also to protect the filter cloth from the scraping action of the doctor blade, it is customary to wind the drum with a helix of small or fine wire. This wire is generally anchored at one end, wound the full length of the drum, and the free end of the wire is attached to a tension spring. I have found that in the use of a filter wound in this manner the wire has a tendency to stretch an appreciable amount, so that in the length of wire ordinarily used the stretch soon exceeds the limit of the tension spring and the wire becomes loose. The loosening of this wire gives rise to considerable trouble in the operation of a filter of this character, and with the conventional type of winding and tension applying means described above, necessitates frequent shut-downs to replace or tighten the wire.

It is a primary object of this invention to provide in a filter of the class described improved suction responsive or differential pressure responsive means for maintaining the exterior helical wire cage under substantially uniform tension at all times, irrespective of any stretch or elongation which may take place in the wire forming such cage.

It is a further object of my invention to provide means for retaining, on the wire, the tension secured by the suction responsive means in the event the vacuum should fail or during such time as the filter is idle.

The details in the construction of the preferred embodiment of my invention together with other objects attending its production will be best understood from the following description of the accompanying drawings, which were chosen for an illustrative purpose only, and in which:

Figure 1 is a side elevation partly broken away illustrating one embodiment of my invention;

Figure 2 is a sectional elevation illustrating further details in the construction of drum type filters and the manner in which a tension maintaining means of the type contemplated by this invention may be applied thereto;

Figure 3 is an enlarged fragmentary sectional elevation illustrating further details in the construction of a preferred embodiment of my invention;

Figure 4 is an end view taken in the direction of the arrow 4 in Figure 3, and illustrating the manner in which a pair of tension applying means may be employed; and Figure 5 is a fragmentary section on the line 5—5 of Figure 4.

More particularly describing the invention as herein illustrated, reference numeral 11 indicates a filter drum which is shown as being supported in bearings 12 and 13, the bearing 13 being associated with a valve manifold 14 of conventional type, designed to apply suction and pressure to the various peripheral filter chambers on the drum in the manner herein above described.

Associated with the drum 11 is a tank 15, through which the bottom portion of the drum revolves, and which is adapted to contain the fluid mixture to be filtered.

The periphery of the drum 11 is covered with a filter cloth in a manner to be hereinafter more fully described, and in the illustrated embodiment of my invention this cloth is held in place by means of wires indicated generally by reference numerals 16 and 16'. These wires 16 and 16' have their inner ends anchored to the drum in any suitable manner, such as by means of pins 17 and 17' preferably located diametrically opposite each other at an intermediate portion of the drum. As will be observed from Figure 2, the drum incorporates reenforcing rings indicated by the letter R and in the preferred embodiment of my invention the pins 17 and 17' are anchored in the central ring indicated at R in Figure 2.

The wires 16 and 16' are wound spirally upon the filter cloth in opposite directions as indicated in Figure 1, and their free ends pass over suitable guide means, to be later described, and into cylinders generally indicated by reference numerals 18 and 18, where they are attached to suction or differential pressure-responsive pistons. Although Figs. 1–3 inclusive illustrate a single wire, it is preferable to employ the spiral winding in sets consisting of a pair or plurality of wires, in which event a corresponding number of suction cylinders will be employed. Such an arrangement is illustrated in Figure 4, where the free ends of the two wires are indicated at 16f and 16a and the two cylinders at 18 and 18a.

In the form of my invention shown in Figures 1 and 2 the inner ends of the cylinders 18 and 18', communicate with suction or vacuum lines 19 and 19', which in turn connect with a suction manifold 20 that extends through the center of the bearing member 12, where it connects through a swivel joint 21 to a fixed vacuum line 22 leading to any suitable source of suction or reduced pressure not shown.

The drum 11 is adapted to be rotated in any suitable manner, such as by means of the worm gear drive generally indicated 25 and at a point just prior to entering the tank 15, the periphery of the drum is engaged by the scraping blade hereinabove referred to, which is not shown on the drawings.

The pipes leading to the various filter chambers on the periphery of the drum are indicated generally by reference numerals 26. This pipe arrangement, however, as well as the general construction of the filter drum with its means of operation form no part of the present invention and are shown and described herein only in so far as their construction is necessary to illustrate the purpose and construction of the outside spiral cage and the means for applying constant tension thereto.

Figures 3 and 4 illustrate more in detail a construction of a preferred form of mechanism for applying tension to the spiral cage. In this figure, the shell of the drum is indicated by reference numeral 30, such shell being divided by suitable partition means into the filter chambers referred to above, each of which communicates with an outlet pipe 31. Supported on the shell 30 is a coarse wire mesh indicated at 33, which carries a fine wire screen 34 upon which the filter cloth 35 is wrapped. This cloth is held in place by any suitable clamping means, such as is indicated 37 in Figure 3, and the spiral wire cage discussed above, indicated by numeral 16 in Figure 3, is shown as engaging the cloth.

For the purpose of guiding the free end of the wire downwardly over the end of the drum, I provide a small sheave 38 shown as being mounted on a threaded pin 39 and located in a recess 40 formed on the end ring R' of the drum.

The suction cylinder 18 in this embodiment of my invention is shown as being mounted in a supporting head 42, which in turn has threaded engagement with an opening 43 in the end plate E of the drum. This head 42 carries a disk 44, which is provided with a bracket 45 carrying a second guide sheave 46 over which the free end 16f of the wire extends. The wire as it passes over the sheave 46 is conducted through a central opening 47 in the disk and is attached in any suitable manner, such as the bolt 48, to a suction-responsive piston 49.

As has been previously pointed out, the cylinder 18 is connected through the pipes 19 and 20 to a source of substantially constant vacuum, which will act upon the piston at all times and will be effective to maintain substantially uniform tension in the wire 16, regardless of any stretch or elongation which may take place in the wire. The cylinders 18 and 18' should preferably be of substantial length, and in assembling the device it is preferable that the pistons 49 be located at or immediately adjacent to the outer end of the corresponding cylinder, as the drum has been initially wound with the wrapping wire. In this way the full length of the cylinder can be utilized in taking up slack and stretch in the wire.

As I have previously stated, it is a further object of the invention to provide means for retaining tension on the wire in the event vacuum in cylinders 18, etc., should fail or in the event of shut-down. This is preferably accomplished by placing clamping devices (indicated at C and C' in Figure 4) between the guide sheaves 38 and 45.

This clamping device may take various forms and is shown as comprising a grooved block 50 through which the wire extends, such block being suitably attached to the head E, such as by means of an angle bracket 51 welded or otherwise attached. The block 50 has a bifurcated projection 52 within which an eccentric 53 is pivoted on a pin 54 to engage the wire 16f (etc.).

The eccentric 53 has a lever arm 56 which is attached to a tension spring 57, and the cam or eccentric is so designed that substantial pressure is exerted on the wire only when it tends to move in a direction opposite to the movement imposed by the piston. The design of the clamp is such that the wire will not be held too firmly, but will allow the wire to contract without stretching or breaking during temperature changes (possibly from 0° F. or less to 90° F.) when the filter is idle.

It is to be understood that while I have herein described and illustrated one preferred embodiment and application of my invention and one preferred arrangement of the differential pressure responsive means, the invention is not limited to the precise structural details described and illustrated herein but includes within its scope whatever changes fairly come within the spirit of the appended claims.

I claim:

1. In combination with a drum type filter having a peripheral filter medium and a spirally wound wire in external engagement therewith, means for maintaining a predetermined tension in said wire comprising: a differential pressure cylinder in said filter drum; a piston in said cylinder attached to the end of said wire; means for producing a differential pressure within said cylinder and means for directing said wire from the periphery of said drum into said cylinder.

2. In combination with a drum type filter having a peripheral filter medium and a spirally wound wire in external engagement therewith, means for maintaining a predetermined tension in said wire comprising: a differential pressure cylinder in said filter drum; a piston in said cylinder attached to the end of said wire; and means for maintaining a substantially constant pressure differential in said cylinder on opposite side of said piston whereby said wire is maintained under substantially constant tension regardless of elongation thereof.

3. In combination with a drum type filter having a peripheral filter medium and a spirally wound wire in external engagement therewith, means for maintaining a predetermined tension in said wire comprising: a cylinder in said drum; means for applying suction within said cylinder; a suction responsive piston in said cylinder; guide means for directing an end of said wire into said cylinder; and means for securing said wire to said piston.

4. The combination of a drum type filter having a spiral wire cage wound thereon; a suction responsive member attached to one end of said wire, said suction-responsive member being movable in a wire-pulling direction by the application of suction thereto; and means for applying substantially constant suction to said suction responsive member, thereby maintaining substantially uniform tension in said wire.

5. The combination of a drum type filter having a peripheral filter medium, exterior supporting and protecting means for said filter medium comprising: spirally wound wires anchored to an intermediate portion of said drum and wound in opposite directions to the ends of said drum; suction responsive means mounted in the end portions of said drums and secured to the free ends of said wires, said suction-responsive means being movable, under application of suction thereto, in a wire-tensioning direction; and means for applying suction to said suction responsive means.

6. In combination with a drum-type filter having a peripheral filter medium and a spirally wound wire in external engagement therewith, means for maintaining a predetermined tension in said wire comprising: differential pressure-responsive means supported by said filter drum, a movable member in said last-mentioned means attached to the end of said wire and applying tension to said wire under the action of a pressure differential; and means for applying a pressure differential in said differential pressure-responsive means.

7. In combination with a drum-type filter having a peripheral filter medium and a spirally wound wire in external engagement therewith, means for maintaining a predetermined tension in said wire comprising: differential pressure-responsive means supported by said filter drum, a movable member in said last-mentioned means attached to the end of said wire and applying tension to said wire under the action of a pressure differential; means for applying a pressure differential in said differential pressure-responsive means; and clamping means on said drum engaging said wire, said clamping means including a unidirectional clamping element adapted to permit tensioning movement of said wire and to exert a clamping action thereon with an opposite wire movement.

8. In combination with a drum-type filter having a peripheral filter medium and a spirally wound wire in external engagement therewith, means for maintaining a predetermined tension in said wire comprising: a differential pressure cylinder in said filter drum; a piston in said cylinder attached to the end of said wire; means for maintaining a substantially constant pressure differential in said cylinder on opposite sides of said piston; and clamping means on said drum engaging said wire, said clamping means including a unidirectional clamping element adapted to permit tensioning movement of said wire and to exert clamping action thereon with an opposite wire movement.

EDDIE R. KEHRER.